United States Patent [19]

Fraser

[11] Patent Number: 4,507,760

[45] Date of Patent: Mar. 26, 1985

[54] FIRST-IN, FIRST-OUT (FIFO) MEMORY CONFIGURATION FOR QUEUE STORAGE

[75] Inventor: Alexander G. Fraser, Bernardsville, N.J.

[73] Assignee: AT&T Bell Laboratories, Murray Hill, N.J.

[21] Appl. No.: 407,877

[22] Filed: Aug. 13, 1982

[51] Int. Cl.³ .............................................. G11C 7/00
[52] U.S. Cl. ................................... 365/221; 364/134
[58] Field of Search ....................... 365/219, 220, 221; 364/134, 136

[56] References Cited

U.S. PATENT DOCUMENTS

| | | | |
|---|---|---|---|
| 2,907,004 | 9/1959 | Chien et al. | 340/174 |
| 3,553,651 | 1/1971 | Bird et al. | 340/172.5 |
| 3,633,173 | 1/1972 | Edge | 340/172.5 |
| 3,818,461 | 6/1974 | Ward et al. | 340/172.5 |
| 3,979,733 | 9/1976 | Fraser | 365/230 |
| 4,151,609 | 4/1979 | Moss | 365/221 |
| 4,163,291 | 7/1979 | Suzuki | 365/221 |
| 4,222,102 | 9/1980 | Jansen | 364/200 |

FOREIGN PATENT DOCUMENTS 2260141 8/1975 France .

OTHER PUBLICATIONS

IBM Technical Disclosure Bulletin, vol. 24, No. 3, Aug. 1981, (New York US), Cary et al.: "Data Buffer Management", pp. 1502–1503.
IBM Technical Disclosure Bulletin, vol. 20, No. 8, Jan. 1978, (New York US), Chapman et al.: "Data Management in a Circular Buffer", pp. 3309–3310.

Primary Examiner—Terrell W. Fears
Attorney, Agent, or Firm—Robert O. Nimtz

[57] ABSTRACT

A first-in, first-out queue has a random access memory (RAM) for storing a plurality of information words, seriatim. A controller is used to insure that only after a complete message, comprising the information words, has been received will a word of that message be read out. Three pointers are used to effect this result. A read pointer addresses the location in the RAM from where a word may be read. A write pointer addresses the location in the RAM where a word may be entered. A third pointer addresses the location in the RAM where the last word of a complete message is stored.

4 Claims, 3 Drawing Figures

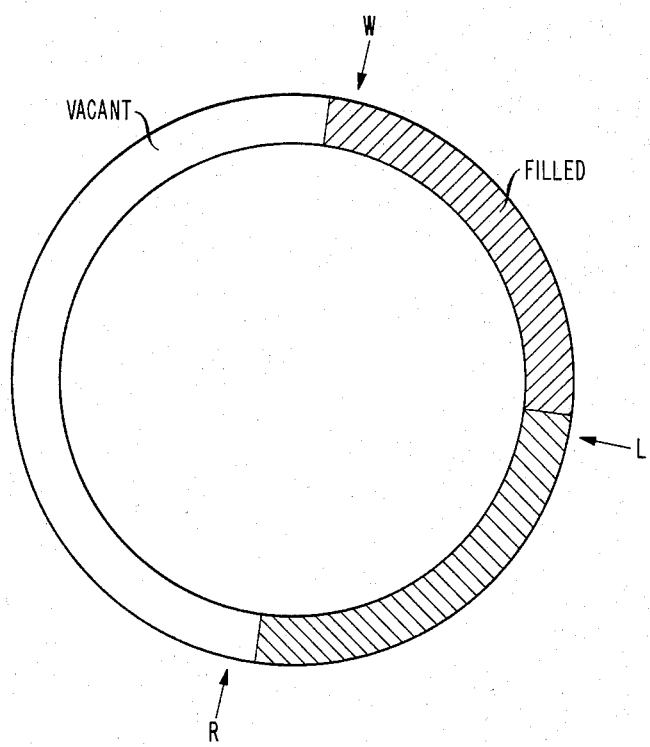

FIRST-IN, FIRST-OUT (FIFO) MEMORY CONFIGURATION FOR QUEUE STORAGE

TECHNICAL FIELD

This invention relates to digital communications systems and, in particular, to FIFO memories enabling multiword messages to be written therein one word at a time and to be read out therefrom as complete messages.

BACKGROUND OF THE INVENTION

In telecommunications transmission systems, there arises sometimes a need to store information from a transmitter because the receiver is busy. The information, however, must be recovered from storage in the same order in which transmitted. This process is known as first-in, first-out (FIFO).

In U.S. Pat. No. 3,979,733 granted Sept. 7, 1976 to Mr. A. G. Fraser, there was disclosed a FIFO queue. A read register, in the aforesaid Fraser patent, has recorded therein the address of the next memory cell to be read. Likewise, a write register has recorded therein the address of the next memory cell available for storing data. A comparison of the read and write registers indicates whether the memory cells are all full, all empty or partially empty.

It is frequently desired to use a FIFO queue as a communication path between a data producing process and a separate data consuming process. These processes are typically independent of one another and may not even be controlled from a common clock source. That is, the two processes may be asynchronous with respect to one another. The path carries messages from the data producing process to the data consuming process and it is frequently required to guarantee that the consuming process obtain only complete messages.

A problem arises if the data producing process has to abandon a message after inserting some of it into the FIFO queue. In that case, the consuming process may already have started the message. This situation arises, for example, when the data producing process is a transmission line with error detection equipment and the consuming process is a computer. If an error is detected partially through an arriving message, it is usually desired that the message be discarded and not processed by the computer.

In the aforesaid Fraser patent, however, there is no way of knowing when a complete message has been received. In the absence of such knowledge it is common practice to use two memories. The first memory is used to assemble one complete message at a time. The second memory is used to operate as a FIFO system in which the unit of storage is a message. Such an arrangement usually requires high speed processing circuitry which then becomes a bottleneck limiting throughput. Further, because two memories are used, circuitry is necessarily duplicated.

SUMMARY OF THE INVENTION

In accordance with the illustrative embodiment of the present invention there is disclosed a first-in, first-out memory system comprising a controller for storing, seriatim, a plurality of information words in a memory device. Only when a complete message has been stored will the controller allow the aforesaid information words to be read-out in the first-in, first-out sequence.

More particularly, the storage device is a random access memory (RAM) with a capacity for storing N information words, where N is an integer. Such a memory is known as a cyclic memory. The controller comprises three pointer registers: W, R, and L. The W and R pointer registers hold addresses on the RAM locations previously accessed. The L pointer register holds the address of the RAM location where a complete message ends.

When an information word is to be entered in the RAM for storage, the W pointer register is incremented to W+1 modulo N and the address W+1 is compared with the address in the R pointer register. If the values of the two addresses are not equal, the information word is entered in the storage location in the RAM whose address is W+1. Thereafter, the address in the W pointer register is changed inside the controller to W+1.

When an information word is to be read from the RAM, the address in the R pointer register is compared with the address in the L pointer register. If the values of the two addresses are not equal, the address in the R pointer register is incremented by one to R+1 modulo N. The information word, addressed by the R pointer, namely, the locatiobn in the RAM addressed by R+1, is read from the RAM. Thereafter, the address in the R pointer register inside the controller is updated to indicate the new address R+1.

When a complete message has been entered in the RAM, the address of the location where the message ends is entered in the L pointer register. That is, the address in the W pointer register is copied into the L pointer register, thereby effectively moving the L pointer to address the location in the RAM where the complete message ends.

When an error in transmission is detected during the entry of information words in the memory and part way through a message, the previously entered partial message must be discarded. This result is achieved by copying the address in the L pointer register into the W pointer register.

An advantage of the present invention is the use of a single random access memory for the first-in, first-out queue and a single control circuit to implement the necessary queue management. Furthermore, very high speed components are not required and there no longer arises a processing bottleneck. Additionally, because only complete messages are read-out, synchronization problems are avoided.

BRIEF DESCRIPTION OF THE DRAWINGS

FIG. 2 shows a block diagram of a message received by the first-in, first-out queue; and FIG. 3 shows a diagram illustrating the use of the memory in FIG. 1.

DETAILED DESCRIPTION

Figure 1:
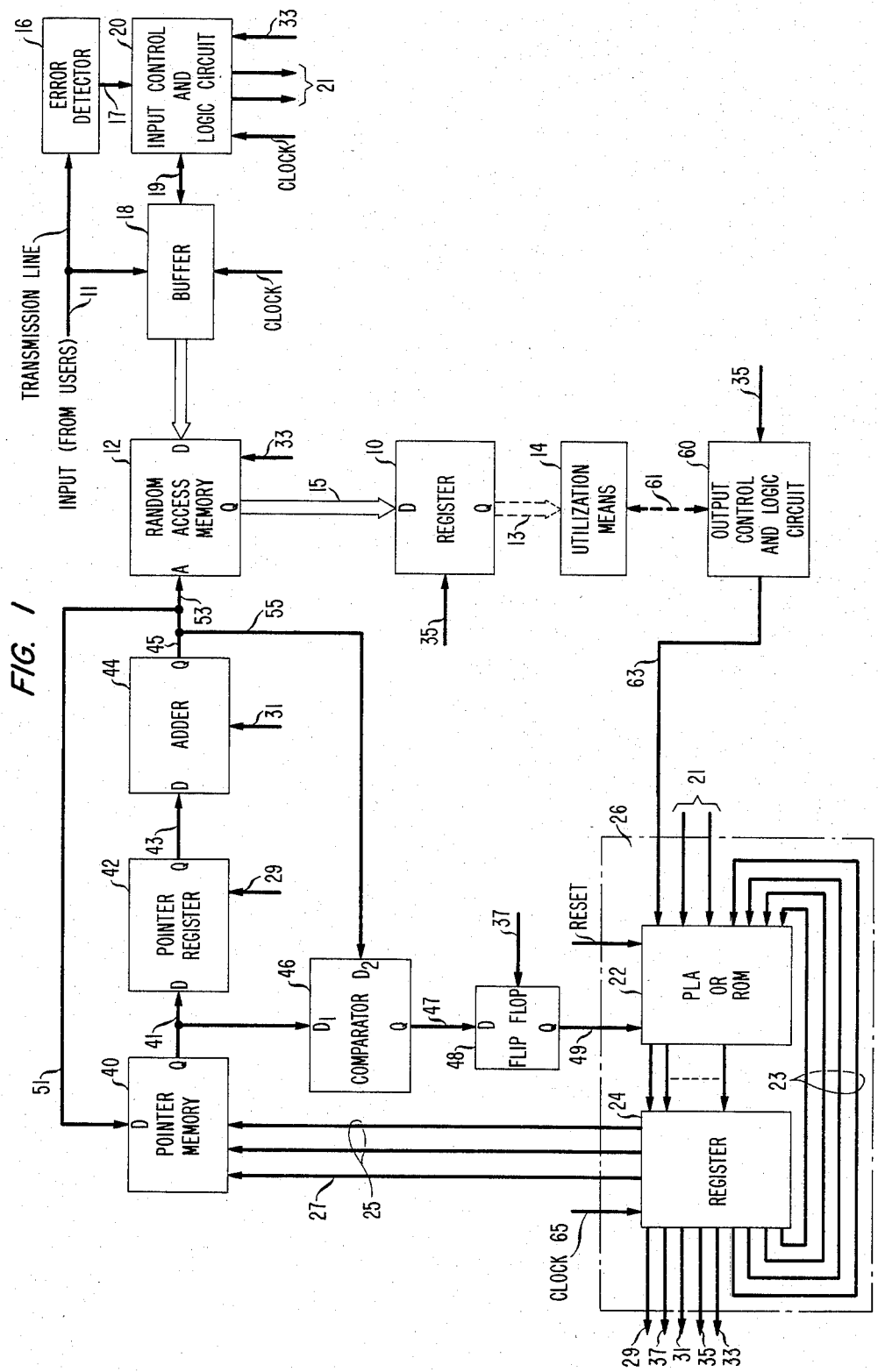
FIG. 1 shows a block diagram of a first-in, first-out queue for storing information words and for reading out the words only when a complete message has been stored.

Referring to FIG. 1, there is shown a random access memory (RAM) 12 for storing information received over a transmission line 11. The information may be transmitted as a message comprising a plurality of information words. One such message is shown in FIG. 2. The format of a message may vary depending on the particular use. The message in FIG. 2 comprises a header 32, data 34, and end of message flag 36. The information words are stored in RAM 12, in FIG. 1, in the order in which they are received over line 11. After all the information words in a complete message have been entered in RAM 12, they are available for retrieval by a utilization means 14, such as a digital computer, a switching machine, and the like. When the message is retrieved from RAM 12, the first information word to be entered therein is read out first. That is, a first-in, first-out queue is realized using a random access memory, RAM 12.

As mssages of data arrive, they are entered simultaneously into error detector 16 and buffer 18. If there exists no error resulting from transmission, lead 17 is enabled. Simultaneously, enabling input control and logic circuit 20 receives information about the beginning and end of messages from buffer 18 to be described hereinbelow.

The use of RAM 12 may be explained by referring to FIG. 3. RAM 12 may be thought of as a circular storage device where information words, comprising a variable number of bits may be stored. Thus, if the number of information words that may be stored in RAM 12 is denoted by N, the information words are entered sequentially in locations 0,1,2 ... N−1. After the location with address N−1 has been filled, the next location to be filled will have address 0. That is, successive locations can be addressed using modulo N arithmetic.

A pointer R addresses the location of the last word that was read from RAM 12. When a word is to be read out from RAM 12, pointer R is incremented by 1 modulo N and the contents of that word at location R+1 is read.

Likewise, a pointer W addresses the location where a word of information was last entered. Thus, when a word of information is to be entered into RAM 12, pointer W is incremented by 1 and the word is entered in the location whose address is W+1 modulo N.

The locations between R+1 modulo N and W represent the words of information available to be read from RAM 12. According to the present invention, messages comprising a plurality of words of information are entered in RAM 12 when received but will not be available for being read from RAM 12 until all information in a message is entered therein. This is achieved by the use of a third pointer L.

When a complete message is received, the end of message flag 36, FIG. 2, carrying a special code is interpreted in the input control circuit 20, FIG. 1. This condition is transmitted over bus 21 to a programmable logic array (PLA) or a read only memory (ROM) 22. Referring to FIG. 3 again, when a complete message is received, the contents of pointer W is copied into pointer L. That is, pointer L addresses the location of the last information word in the complete message.

Before a word is read from RAM 12, pointers R and L are compared. If they point to the same location, the queue does not have a complete message, and a word cannot be read from RAM 12. If pointers R and L address different locations, pointer R is incremented by 1 and the contents of locations R+1 modulo N is read from RAM 12.

Because the memory is circular and is a random access memory, it is necessary to prevent destruction of valid data by insuring that pointer W will not be advanced beyond pointer R. According to the present invention, pointer W is maintained so that when incremented by 1, W+1 modulo N will never be equal to pointer R. That is, there is provided a cusion of one word location.

Referring again to FIG. 1, there is shown a pointer memory 40 which holds three addresses: pointers W, L, and R. In the illustrative embodiment, each pointer is twelve bits long. Pointer register 42 is large enough to hold a single pointer. Adder 44 is designed to add either zero or one modulo N to its input value, namely, an address indicated by pointer W, L or R. RAM 12 has one word location for every information word from buffer 18. Further RAM 12 has as many locations as can be addressed by a single pointer. Thus, in the illustrative embodiment, because each pointer has twelve bits, each pointer can address 4,096 words ($2^{12}$) in RAM 12, that is, N=4,096, in this illustration. Register 10 is wide enough to store a single word of information read from RAM 12. Comparator 46 compares the values of two addresses and produces an output. If the two addresses are equal, the output from comparator 46 is one, otherwise, the output therefrom is zero. Flip-flop 48 stores the output from comparator 46 and that output is made available over lead 49 to ROM 22.

The pointers W, R and L, as stated hereinbefore, address locations in RAM 12 so that information may be written therein or read therefrom. Pointers W and R move cyclicly through RAM 12, one location at a time. As stated hereinbefore, RAM 12 may be conceptualized as a circular buffer having three pointers, W, R and L.

Pointer memory 40 is addressed by leads 25. The address, comprising two bits, indicates the pointer W, R, or L. Depending on the pointer location addressed, a pointer appears at the Q port and on bus 41. When a pointer, which appears on bus 51, is to be entered in pointer memory 40, the location is indicated by address leads 25 and the control lead 27 is enabled. The pointer on bus 41 appears at the D port of pointer register 42 and at the $D_1$ port of comparator 46.

The pointer on bus 41 at the D port is copied into pointer register 42 by enabling the control lead 29. The contents of pointer register 42 is always present at its Q port and on bus 43.

As stated hereinabove, adder 44 adds either zero or one modulo N to its input. The pointer, from pointer register 42, appears at the D port of adder 44 and the quantity, either a zero or a one, appearing on the input lead 31, are added. The resulting sum, pointer +0 (or 1) modulo N, appears at the output port Q and on bus 45. Bus 45 branches into three separate buses: 51, to the D port of pointer memory 40; 53, to the address port A of the RAM 12; and 55, to the $D_2$ port of comparator 46.

Words which are to be entered in RAM 12 appear at the D port thereof. The pointer indicating the address of the memory cell into which the word is to be entered appears at the A port thereof. When the control lead 33 is enabled, the word at the D port is entered into the memory cell of RAM 12 addressed by the pointer on bus 53.

Words which are to be read from RAM 12 are addressed by the pointer on bus 53 again through the A port. Thereafter, the words appear at the Q port of RAM 12 and via bus 15 at the D port of register 10. When control lead 35 is enabled, the word which was read from RAM 12 is entered into register 10 and appears at the Q port thereof and on bus 13.

The input values at the $D_1$ and $D_2$ ports of comparator 46 are compared. If the input values are equal, the output is one; otherwise, the output is zero. The output from comparator 46 is transmitted via bus 47 to the D port of flip-flop 48. When control lead 37 is enabled, the output from comparator 46 is entered in flip-flop 48. The value of flip-flop 48 is continuously present on lead 49 to the ROM 22.

ROM 22 and control register 24 together form a control circuit 26. When utilization means 14 is ready to receive a message, a signal is transmitted over bus 61 to output control and logic circuit 60. Thereafter, output control circuit 60 issues a read command over lead 63 to the ROM 22. Depending on the status of the eight leads 21, 23, 49 and 63 at the input to ROM 22, an instruction is read therefrom and is transferred to control register 24 simultaneously with a clock pulse on lead 65. The contents of register 24, namely the instructions from ROM 22, define the state of the device during the next clock period. Thus, the register 24 holds the current values for the twelve leads 23, 25, 27, 29, 31, 33, 35 and 37. The leads 23 carry a number, comprising four bits, which is fed back as an input to PLA 22 in order that the following state may be generated. The next state as defined by the next instruction from ROM 22 depends upon both the previous state identified by the number on leads 23 and the new inputs on control leads 21, 49 and 63.

Reading Information from the FIFO Queue

In response to a command from utilization means 14, during a first clock period, control circuit 26 causes the address of the R pointer to be transmitted over leads 25 to the pointer memory 40. Simultaneously therewith, control lead 29 is enabled thereby causing the aforesaid R pointer to be entered in pointer register 42. In a second clock period, the lead 31 carries the value zero so that the R pointer is passed intact through adder 44 and appears at the $D_2$ port of comparator 46. During the same second clock period, leads 25 carry the address of the L pointer to pointer register 40 and the L pointer appears at the $D_1$ port of comparator 46. The output from comparator 46 is entered in flip-flop 48 by enabling lead 37. If the queue is empty or does not have a complete message, pointers L and R are equal and the value on lead 49 is one. If the queue, however, has either a partially read message or at least one complete message, the value on lead 49 is zero.

During the third clock period, the value on lead 31 is a one and the adder 44 is allowed to settle down. The value of the output, R+1, from adder 44 appears on bus 53 and points to the word to be read from RAM 12.

During the fourth clock period, if the value on lead 49 was zero during the second clock period, the lead 35 is enabled and a word, which was read from RAM 12 during the third clock period, is entered into register 10. The word is continuously available at the Q port of register 10 and on bus 13. Lead 35 also carries an input signal to the output control logic circuit 60 where it signifies when one word has been read.

During the aforesaid third clock period the incremented R pointer, namely R+1, appears on bus 51 at the D port of pointer memory 40. During the fourth clock period, leads 25 carry the address of the R pointer and lead 27 is enabled, thereby causing the incremented R pointer, R+1, on bus 51 to be entered as the new R pointer in pointer memory 40.

Writing Information into the FIFO Queue

In response to a word being received on line 11, input control circuit 20 transmits this status over leads 21 to control circuit 26. Thereafter, during the first clock period, leads 25 carry the address of the W pointer in pointer memory 40 and the W pointer thus addressed is entered in pointer register 42 by enabling lead 29. During the second clock period, the lead 31 carries the value one so that the output from adder 44 is W+1 which appears at the $D_2$ port of comparator 46. Simultaneously, the leads 25 carry the address of the R pointer in pointer memory 40 and the R pointer thus addressed appears at the $D_1$ port of comparator 46.

During the third clock period, the value of the signal on the lead 31 remains at one and the output from comparator 46 is entered in flip-flop 48 by enabling lead 37. If the output from comparator 46, namely, the contents of flip-flop 48, is zero, it means the R pointer and W+1 are not equal and the word at the D port of RAM 12 may be entered therein.

Thus, during the fourth clock period, if the R pointer and W+1 are not equal, the word at the D port of RAM 12 is entered in the location addressed by W+1 at the A port thereof by enabling lead 33. Lead 33 also carries an input signal to the input control circuit 20 and signifies when a word from buffer 18 has been entered in RAM 12.

During the same fourth clock period, leads 25 carry the address of the W pointer in pointer memory 40 and lead 27 is enabled so that the incremented value, W+1, of the W pointer on bus 51 may be entered in the pointer memory 40.

Signalling the Entry of a Complete Message

When a complete message has been received, as indicated by the end of message flag 36, of FIG. 2, leads 21, in FIG. 1, carry this status to the control circuit 26. In response thereto, the L pointer is updated. This updating requires two clock periods.

During the first clock period, leads 25 carry the address of the W pointer in pointer memory 40. The lead 29 is enabled and the W pointer is copied into the pointer register 42. During the second clock period lead 31 carries the value zero. Thus, the W pointer appears on bus 51. The leads 25 carry the address of the L pointer in pointer memory 40. Lead 27 is enabled thereby copying the value of the W pointer on bus 51 into the L pointer.

Resetting the FIFO Queue

The FIFO queue is reset, or initialized, to render the queue empty by copying the value of the R pointer into the L and W pointer locations in pointer memory 40. This process requires three clock periods.

During the first clock period, the leads 25 carry the address of the R pointer in pointer memory 40 and the R pointer is entered in pointer register 42 by enabling lead 29.

During the second clock period, the value on lead 31 is zero so that the R pointer appears on bus 51. The leads 25 carry the address of the L pointer and by enabling lead 27 the value of the R pointer is copied into the L pointer location in pointer memory 40.

Likewise, during the third clock period, the value on lead 31 remains at zero so that the R pointer continues to appear on bus 51. The leads 25 carry the address of the W pointer and by enabling lead 27 the value of the R pointer is copied into the W pointer location.

Contention Resolution

If both write command leads 21 and read command lead 63 are simultaneously enabled, the control circuit 26 gives priority to the write command leads 21, even if the FIFO queue is full and the operation cannot be completed. The next operation should be the read command on lead 63.

Input Control Process

As stated hereinabove, when an information word is received it is placed in buffer 18 and in error detector 16. With the complete entry of each word in buffer 18, input control circuit 20 transmits a command over leads 21 to ROM 22 thereby causing the information word in buffer 18 to be transferred therefrom and entered into RAM 12.

As stated hereinabove, after each information word is entered in error detector 16, the presence or absence of a transmission error is detected therein. If no transmission error had been detected, lead 17 is enabled. Meanwhile, each word entered in buffer 18 is compared with an end of message flag. When an end of message is detected, that condition is transmitted over bus 19 to input control circuit 20.

When lead 17 is enabled and an end of message signal is received over bus 19 from buffer 18, the input control circuit 20 transmits a command over leads 21 to ROM 22. In response thereto, the address in the W pointer is copied into the L pointer, thereby signifying the entry of a complete message in RAM 12. Thereafter, this message may be read from RAM 12.

Should an error in transmission be detected in error detector 16, however, lead 17 will not be enabled. In the absence of a signal on lead 17, a different command is transmitted from input control circuit 20 over leads 21 to ROM 22. In response thereto, the address in the L pointer is copied into the W pointer, thereby returning the W pointer to an initial position. As a result, no erroneous information words are retained in RAM 12.

What is claimed is:

1. A first-in, first-out memory system for multiword messages comprising:
   an addressable cyclic memory
   a W pointer register for writing words into said memory at the address of the W pointer,
   an R pointer register for reading words from said memory at the address of the R pointer,
   an L pointer register for identifying the last work of a multiword message,
   means for incrementing the W pointer register, and comparing the W pointer register to the R pointer register before storing a new message word and only if the incremented W pointer and the R pointer are not the same,
   means for comparing the contents of the R pointer register with the contents of the L pointer register, and incrementing the R pointer register and reading the memory word addressed by the R pointer register only if the R and L pointers are not the same,
   means responsive to an end of message signal for copying the contents of the W pointer register into the L pointer register, and
   means responsive to an error in a new memory word for copying the contents of the L pointer register into the W pointer register.

2. A first-in, first-out memory system comprising
   memory means for storing a plurality of messages in the order in which they are received,
   means for identifying the beginning of the earliest ones of said messages for reading said messages,
   means for identifying the end of the latest one of said messages for writing said messages,
   message validation means, and
   means responsive to said message validation means for identifying the end of valid ones of said messages for termination said reading of said messages.

3. The first-in, first-out memory system of claim 2 wherein said identifying means comprises pointer addresses into said memory means.

4. The first-in, first-out memory system of claim 2 further comprising means responsive to said message validation means for changing said writing identifying means to said terminating identifying means for invalid ones of said messages.

* * * * *